United States Patent
Coppock et al.

(10) Patent No.: US 10,834,336 B2
(45) Date of Patent: Nov. 10, 2020

(54) THERMAL IMAGING OF AIRCRAFT

(71) Applicant: GE Aviation Systems LLC, Grand Rapids, MI (US)

(72) Inventors: John C. Coppock, Austin, TX (US); Douglass Eric Wood, Houston, TX (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/882,148

(22) Filed: Jan. 29, 2018

(65) Prior Publication Data
US 2019/0238762 A1    Aug. 1, 2019

(51) Int. Cl.
| | |
|---|---|
| *H04N 5/33* | (2006.01) |
| *G06T 7/00* | (2017.01) |
| *B64F 5/60* | (2017.01) |
| *G01N 25/72* | (2006.01) |
| *G07C 5/08* | (2006.01) |

(Continued)

(52) U.S. Cl.
CPC .................. *H04N 5/33* (2013.01); *B64F 5/60* (2017.01); *G01N 25/72* (2013.01); *G06T 7/0004* (2013.01); *G07C 5/0816* (2013.01); *G01J 5/10* (2013.01); *G01J 2005/0077* (2013.01); *G06T 2207/10048* (2013.01); *G06T 2207/30252* (2013.01)

(58) Field of Classification Search
CPC .. H04N 5/33; B64F 5/60; G01N 25/72; G06T 7/0004; G06T 2207/10048; G06T 2207/30252; G07C 5/0816; G01J 5/10; G01J 2005/0077
See application file for complete search history.

(56) References Cited

U.S. PATENT DOCUMENTS

| | | | |
|---|---|---|---|
| 4,943,919 A | 7/1990 | Aslin et al. | |
| 5,059,953 A | 10/1991 | Parsons et al. | |
| 5,582,485 A | 12/1996 | Lesniak | |

(Continued)

FOREIGN PATENT DOCUMENTS

| | | |
|---|---|---|
| CN | 103679341 A | 3/2014 |
| CN | 103970102 A | 8/2014 |

(Continued)

OTHER PUBLICATIONS http://en-us.fluke.com/community/fluke-news-plus/hvac-news/fluke-thermal-imagers-show-the-way-to-safer-flying.html.

(Continued)

*Primary Examiner* — Xiaolan Xu
(74) *Attorney, Agent, or Firm* — Dority & Manning, P.A.

(57) ABSTRACT

A thermal imaging system is provided. The system can include one or more thermal imaging devices, and a turn event controller in operative communication with the one or more thermal imaging devices. The turn event controller can be configured to obtain one or more vehicle parameters associated with an aerial vehicle and obtain one or more thermal images associated with the aerial vehicle during at least one phase of a turn of the aerial vehicle at an airport. The turn event controller can also be configured to process the one or more thermal images based on the one or more vehicle parameters to detect anomalies associated with the turn of the aerial vehicle, and generate, in response to detecting one or more anomalies, one or more signals indicative of the one or more anomalies.

20 Claims, 8 Drawing Sheets

(51) Int. Cl.
*G01J 5/10* (2006.01)
*G01J 5/00* (2006.01)

(56) References Cited

U.S. PATENT DOCUMENTS

| | | |
|---|---|---|
| 5,729,765 A | 3/1998 | Cheng |
| 5,913,912 A | 6/1999 | Nishimura et al. |
| 6,216,066 B1 | 4/2001 | Goebel et al. |
| 6,236,049 B1 | 5/2001 | Thomas et al. |
| 6,262,659 B1 | 7/2001 | Korkosz et al. |
| 6,275,767 B1 | 8/2001 | Delseny et al. |
| 6,278,965 B1 | 8/2001 | Glass et al. |
| 6,292,723 B1 | 9/2001 | Brogan et al. |
| 6,529,820 B2 | 3/2003 | Tomescu |
| 6,539,783 B1 | 4/2003 | Adibhatla |
| 6,628,995 B1 | 9/2003 | Korson et al. |
| 6,721,714 B1 | 4/2004 | Baiada et al. |
| 6,775,647 B1 | 8/2004 | Evans et al. |
| 6,799,154 B1 | 9/2004 | Aragones et al. |
| 6,892,127 B2 | 5/2005 | Wiseman |
| 6,901,377 B1 | 5/2005 | Rosenfeld et al. |
| 6,961,732 B2 | 11/2005 | Hellemann et al. |
| 7,020,595 B1 | 3/2006 | Adibhatla et al. |
| 7,096,210 B1 | 8/2006 | Kramer et al. |
| 7,181,478 B1 | 2/2007 | Korson et al. |
| 7,197,503 B2 | 3/2007 | Palanisamy et al. |
| 7,328,128 B2 | 2/2008 | Bonanni et al. |
| 7,333,887 B2 | 2/2008 | Baiada et al. |
| 7,379,799 B2 | 5/2008 | Cleary et al. |
| 7,461,019 B2 | 12/2008 | Wang |
| 7,509,537 B1 | 3/2009 | Jensen et al. |
| 7,548,802 B2 | 6/2009 | Avery et al. |
| 7,742,938 B2 | 6/2010 | Blanchard et al. |
| 7,809,527 B2 | 10/2010 | Bailly et al. |
| 7,813,871 B2 | 10/2010 | Small et al. |
| 7,826,943 B2 | 11/2010 | Yu et al. |
| 7,921,350 B2 | 4/2011 | Eklund |
| 7,979,192 B2 | 7/2011 | Morrison et al. |
| 7,983,809 B2 | 7/2011 | Kell et al. |
| 8,103,462 B2 | 1/2012 | Liu et al. |
| 8,121,778 B2 | 2/2012 | Brozat |
| 8,220,991 B2 | 7/2012 | Safai et al. |
| 8,364,340 B2 | 1/2013 | Nestico et al. |
| 8,401,760 B2 | 3/2013 | Payne et al. |
| 8,483,902 B2 | 7/2013 | Cornet et al. |
| 8,489,604 B1 | 7/2013 | Sadovsky et al. |
| 8,527,327 B1 | 9/2013 | Lawrence |
| 8,560,376 B2 | 10/2013 | Lienhardt |
| 8,566,016 B2 | 10/2013 | Law et al. |
| 8,645,148 B2 | 2/2014 | Small et al. |
| 8,676,436 B2 | 3/2014 | Raimarckers et al. |
| 8,694,196 B1 | 4/2014 | Doulatshahi et al. |
| 8,694,238 B2 | 4/2014 | Venkatasubramanian |
| 9,208,209 B1 | 12/2015 | Katz |
| 9,321,542 B2 | 4/2016 | Dunsdon |
| 9,412,025 B2 | 8/2016 | Wieser |
| 9,424,521 B2 | 8/2016 | Bloomquist et al. |
| 9,437,114 B2 | 9/2016 | Ince et al. |
| 9,443,447 B2 | 9/2016 | Bailiang |
| 9,449,033 B2 | 9/2016 | Kache et al. |
| 9,477,224 B2 | 10/2016 | Khan et al. |
| 9,495,879 B2 | 11/2016 | Depape et al. |
| 9,501,455 B2 | 11/2016 | Quadracci et al. |
| 9,669,940 B1* | 6/2017 | Tiana .................... B64D 45/00 |
| 9,708,078 B2 | 7/2017 | Cox et al. |
| 2004/0010444 A1* | 1/2004 | Delorme ............. G01R 31/281 |
| | | 702/183 |
| 2004/0139035 A1 | 7/2004 | Wang |
| 2004/0143488 A1 | 7/2004 | Wang |
| 2004/0176887 A1 | 9/2004 | Kent et al. |
| 2005/0090969 A1 | 4/2005 | Siok et al. |
| 2006/0095156 A1 | 5/2006 | Baiada et al. |
| 2007/0262637 A1* | 11/2007 | Bennett ................. B60T 13/662 |
| | | 303/3 |
| 2008/0010107 A1 | 1/2008 | Small et al. |
| 2008/0046167 A1 | 2/2008 | Small et al. |
| 2010/0063716 A1 | 3/2010 | Brozat |
| 2010/0185426 A1 | 7/2010 | Ganesan et al. |
| 2012/0254084 A1 | 10/2012 | Richter et al. |
| 2012/0260179 A1 | 10/2012 | Reshadi et al. |
| 2012/0283963 A1 | 11/2012 | Mitchell et al. |
| 2013/0013182 A1 | 1/2013 | Bertsimas et al. |
| 2013/0138584 A1 | 5/2013 | Vana et al. |
| 2013/0197739 A1* | 8/2013 | Gallagher ................. B64F 5/60 |
| | | 701/31.5 |
| 2013/0335550 A1* | 12/2013 | Rochenski ........... G08B 17/125 |
| | | 348/82 |
| 2013/0339073 A1 | 12/2013 | Dabbiere |
| 2014/0022380 A1 | 1/2014 | Nissen et al. |
| 2014/0049640 A1* | 2/2014 | Shishalov ............. G08B 17/005 |
| | | 348/143 |
| 2014/0052410 A1 | 2/2014 | Tralshawala et al. |
| 2014/0204217 A1* | 7/2014 | Sohn ..................... G01J 5/0859 |
| | | 348/164 |
| 2014/0343833 A1 | 11/2014 | Baiada et al. |
| 2015/0068289 A1 | 3/2015 | Zhong et al. |
| 2015/0151834 A1 | 6/2015 | Cox et al. |
| 2015/0163087 A1 | 6/2015 | Conner et al. |
| 2015/0239573 A1* | 8/2015 | Jouper ............... B64D 11/0015 |
| | | 701/3 |
| 2015/0330797 A1 | 11/2015 | Shukla |
| 2015/0348422 A1 | 12/2015 | Agrawal et al. |
| 2016/0178593 A1 | 6/2016 | Miller et al. |
| 2016/0203722 A1 | 7/2016 | Liao et al. |
| 2016/0232468 A1 | 8/2016 | Meiri et al. |
| 2016/0314328 A1 | 10/2016 | Hosamane et al. |
| 2016/0318135 A1 | 11/2016 | Raulerson et al. |
| 2016/0321423 A1 | 11/2016 | Bhatt et al. |
| 2017/0300847 A1* | 10/2017 | Jones .................... G07G 1/0036 |
| 2018/0086596 A1* | 3/2018 | Collins ..................... B66B 1/28 |

FOREIGN PATENT DOCUMENTS

| | | |
|---|---|---|
| GB | 2430278 B | 12/2008 |
| WO | WO02/099769 A1 | 12/2002 |

OTHER PUBLICATIONS http://en-us.fluke.com/community/fluke-news-plus/a-test-wing-with-frost.html.
Stumper et al., Thermal Imaging in Aviation, Research Gate, ISSN 1805-7578, pp. 13-16. https://www.researchgate.net/publication/304584391_Thermal_Imaging_in_Aviation. Sep. 6, 2017.
U.S. Appl. No. 15/696,318, filed Sep. 6, 2017.
U.S. Appl. No. 15/653,294, filed Jul. 18, 2017.
Airport Visualiser, Not only do we know IT, We are also Experts in Aviation, Zebra Enterprise Solutions, 4 pages. http://zebra.basecent.com/admin/resources/images/7/0/1607.pdf.
News Release—Abu Dhabi Airport Services selects the proveo Airport Visualiser, Zebra Enterprise Solutions, May 27, 2009, 3 Pages. http://www.zebra.com/content/dam/zebra/press-releases/en-us/2009/abu-dhabi-en.pdf.
Abu Dhabi Airport Services, Zebra Enterprise Services, 1 page. https://www.zebra.com/content/dam/zebra/success-stories/en-us/pdfs/abu-dhabi-en-us.pdf.
Turn Time Management—Solutions, PASSUR Aerospace, 3 pages. http://www.passur.com/solutions/airlines/turn-time-management/.
Collins, ARINC AirTQM The real-turnaround management system, ARINC Airports, rockwellcollins.com, 2 pages. https://www.rockwellcollins.com/-/media/Files/Unsecure/Services-And-Support/Information-Management/ARINC-Airports/Airport-Operations/ARINC-Airports_AirTQM_data-sheet_A4-EMEA.ashx.

* cited by examiner

THERMAL IMAGING OF AIRCRAFT

FIELD

The present subject matter relates generally to aircraft and, in particular, to enhanced thermal imaging of aircraft.

BACKGROUND

Airplane turn time is the time required to unload an airplane after its arrival at the gate and to prepare it for departure again. Generally, airplane turn time has increased in commercial aviation due to a variety of factors, including fueling operations, aircraft servicing, passenger deboarding, flight crew deboarding, associated safety checks, and other requirements. Decreasing airplane turn time while ensuring high standards of safety is challenging. Furthermore, automating some or all of typical pre-flight safety checks may be challenging or detrimental in some circumstances.

BRIEF DESCRIPTION

Aspects and advantages of the disclosed technology will be set forth in part in the following description, or may be obvious from the description, or may be learned through practice of the disclosure.

According to an example embodiment, a thermal imaging system to analyze aircraft can include one or more thermal imaging device, and a turn event controller in operative communication with the one or more thermal imaging devices. The turn event controller can be configured to obtain one or more vehicle parameters associated with an aerial vehicle, obtain one or more thermal images associated with the aerial vehicle during at least one phase of a turn of the aerial vehicle at an airport, process the one or more thermal images based on the one or more vehicle parameters to detect anomalies associated with the turn of the aerial vehicle, and generate, in response to detecting one or more anomalies, one or more signals indicative of the one or more anomalies.

According to another example embodiment, a thermal imaging system to analyze aircraft can include one or more thermal imaging devices arranged about a gate area of an airport, one or more databases configured to store vehicle parameters associated with various aircraft, and one or more processors in operative communication with the one or more thermal imaging devices and the one or more databases. The one or more processors can be configured to retrieve vehicle parameters from the one or more databases, and the vehicle parameters are associated with an aerial vehicle. The one or more processors can also be configured to obtain one or more thermal images associated with the aerial vehicle during at least one phase of a turn of the aerial vehicle at the airport, process the one or more thermal images based on the one or more vehicle parameters to determine one or more turn parameters indicative of a condition of the aerial vehicle or an area proximate the aerial vehicle, and transmit one or more signals including the one or more turn parameters.

According to yet another example embodiment, a computer-implemented method to analyze aircraft can include obtaining one or more vehicle parameters associated with an aerial vehicle, obtaining one or more thermal images associated with the aerial vehicle, processing the one or more thermal images based on the one or more vehicle parameters to detect anomalies associated with an event associated with the aerial vehicle, generating, in response to detecting one or more anomalies, one or more signals indicative of the one or more anomalies, and issuing, based on the one or more signals, one or more warning messages based on the one or more signals.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
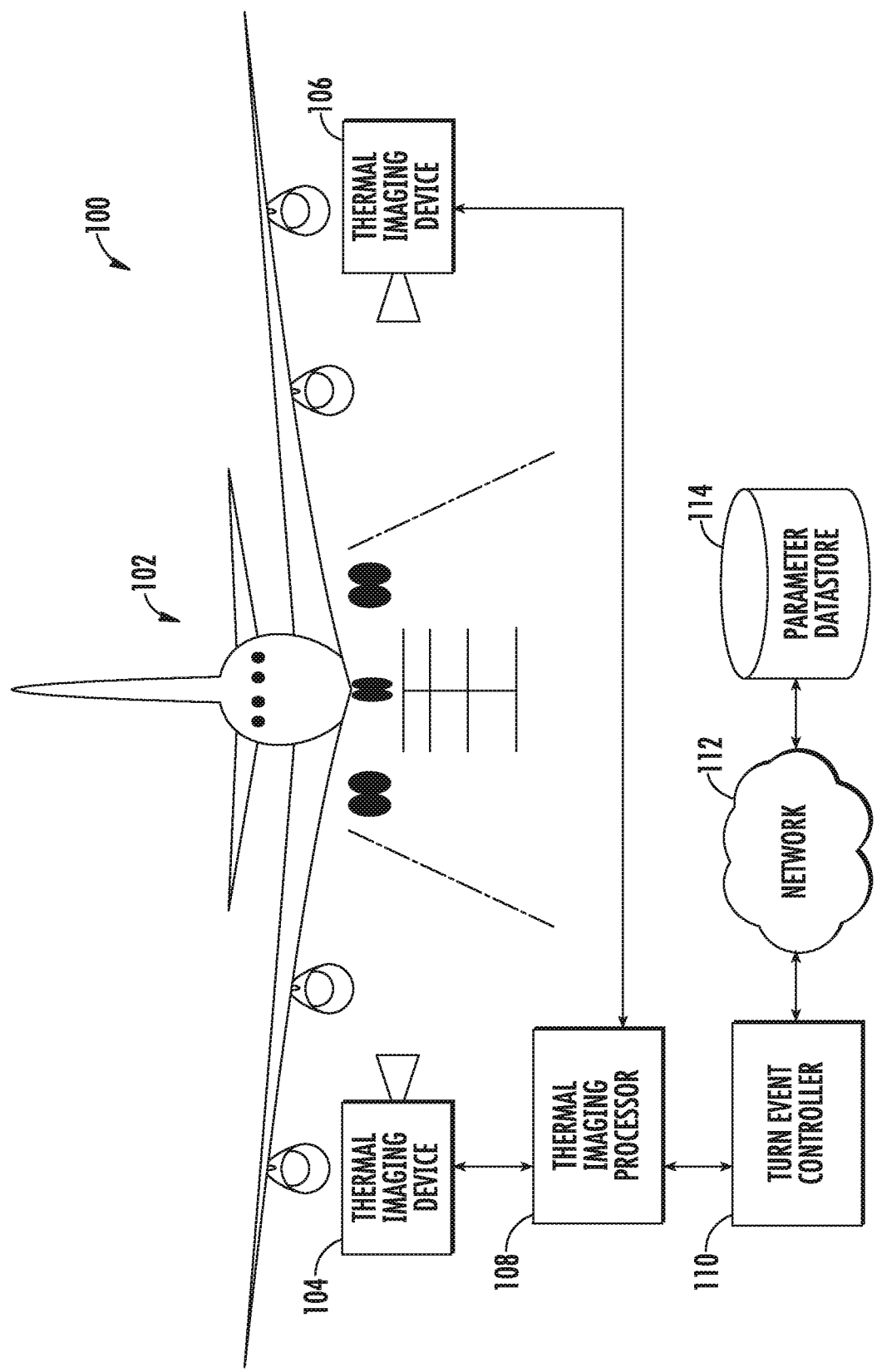
FIG. 1 is a schematic illustration of thermal imaging system to analyze aircraft, according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to observing and/or analyzing aircraft at an airport at various phases of turn events using thermal imaging and/or computer vision. A plurality of thermal imaging devices can record thermal images, including thermal imaging video, about an aircraft. For example, at least one of the plurality of thermal imaging devices can capture thermal images of an aircraft landing or parking, thermal images of unloading and/or loading passengers of an aircraft, thermal images of below wing unloading and/or loading of an aircraft, thermal images of an aircraft being serviced (e.g., HVAC, fueling, etc.), thermal images of aircraft equipment (e.g., tires, landing gear, hydraulics, HVAC, PAC or PACKS, etc.), etc. The plurality of thermal imaging devices can capture thermal images of the aircraft and other objects at various phases of an aircraft turn.

The plurality of thermal imaging devices can provide the thermal images to a controller or processor. The controller or processor can use computer vision to determine one or more turn parameters indicative of a condition of the aerial vehicle or an area proximate the aerial vehicle. The turn parameters can be used to generate one or more signals identifying the condition of the aerial vehicle or the area proximate the aerial vehicle. In some example, a signal including the turn parameters is transmitted. The controller or processor can use computer vision to identify one or more anomalies within one or more of the thermal images. The anomalies may be directly or indirectly associated with the aircraft or equipment of the aircraft. The anomalies can be used to generate one or more signals identifying the anomalies. The signals associated with anomalies or turn parameters can trigger warning messages, prohibition of aircraft takeoff, and further inspection by non-automated processes such as by skilled technicians. The thermal images can also be compared to expected thermal signatures and used for future analytics. Stored thermal images of previous aircraft turn events and associated analytics can be retrieved and compared to avoid potential false positives for anomalies and/or false warnings and/or false prohibition of aircraft takeoff operations.

Computer vision processing and thermal imaging processing can occur in real-time. Corrective action can be taken in real-time based on the processing. Furthermore, detailed reports of thermal images, and any associated anomalies, can also be provided to proper personnel. The detailed reports may include turn parameters, any associated anomaly, any recommended corrective action, and/or any suitable information necessary to ensure safe operation of the aircraft under thermal imaging. Furthermore, objects, personnel, and other objects near or proximal the aircraft can be thermal imaged as described herein. In this manner, additional anomalies such as fuel leaks, coolant leaks, personnel in restricted areas, security risks, illegal activities, and other anomalies can be quickly identified through the systems described herein.

In this way, the systems and methods according to example aspects of the present disclosure can have a technical effect of improving the processing of aircraft turn operations by automatically detecting anomalies in aircraft turn operations, and therefore reducing the computational resources required to address aircraft inspection on a point-to-point basis. Further, the systems and methods according to example aspects of the present disclosure can have a technical effect of improving the processing of aircraft turn operations by reducing procedural violations in aircraft turn operations, and therefore reducing the computational resources required to address procedural violations in aircraft turn operations.

FIG. 1 is a schematic illustration of a thermal imaging system 100 to analyze aircraft, according to example embodiments of the present disclosure. The aerial vehicle 102 can be positioned proximal one or more thermal imaging devices 104, 106. The aerial vehicle 102 can be thermal imaged prior to landing, during landing, during taxying, while at a gate, while departing a gate, and/or while taking off. Accordingly, although illustrated as being positioned about the aerial vehicle 102, it should be understood that the thermal imaging devices 104, 106 may be relatively easy to move or relocate. However, the positions of the thermal imaging devices 104, 106 may in some cases be fixed. Generally, the system 100 is operative to thermal image an aircraft at an airport or other serviceable area, such as an aircraft hangar, an aircraft carrier, or other suitable area, using the thermal imaging devices 104, 106.

The thermal imaging devices 104, 106 may each be a same or similar thermal imaging device, in some implementations. In at least one implementation, the thermal imaging devices 104, 106 are thermal imaging cameras configured to provide still images or static thermal signature data. In another implementation, the thermal imaging devices 104, 106 are thermal imaging cameras configured to provide thermal imaging video or dynamic thermal signature data. In another implementation, the thermal imaging devices 104, 106 are different or distinct devices configured to provide varying forms or formats of thermal imaging data. Furthermore, it should be understood that although a particular number of thermal imaging devices is illustrated, that more or fewer thermal imaging devices may be used in any desired implementation.

The thermal imaging devices 104, 106 may be in operative communication with thermal imaging processor 108. For example, the thermal imaging processor 108 may be a computer apparatus configured to receive, obtain, or otherwise retrieve thermal images of the aerial vehicle 102 and any adjacent or proximal objects, via the thermal imaging devices 104, 106. The thermal images may be still images or recorded thermal image video. The thermal images may be processed at the thermal imaging processor 108, or can be processed remotely or at a second processor.

The thermal imaging processor 108 can be in operative communication with a turn event controller 110. The turn event controller 110 may be a computer apparatus configured to process, examine, compare, and/or analyze thermal images and thermal image video. The turn event controller 110 may be configured to generate one or more signals indicative of turn parameters or anomalies identified (or potential anomalies identified) through processing of thermal images or the aerial vehicle 102.

According to at least one example embodiment, anomalies can include, but are not limited to, ice formation on aircraft surfaces, ice sublimation from aircraft surfaces, fuel levels prior to refueling, fuel levels after refueling, fuel leaks, hydraulic leaks, tire temperature, tire wear, uneven heat distribution on tires, landing gear temperature, landing gear brake temperature, external air handler temperatures, potential ignition sources external to an aircraft, potential ignition sources in the interior of an aircraft, potential fire hazards in or about an aircraft, potential fire hazards in the cargo area of an aircraft, missing or extra cargo in the aircraft, missing or extra passengers on the aircraft, missing or extra personnel on the aircraft, electrical equipment over-heating or over-cooling on the aircraft, issues in equipment used to service an aircraft, and any other anomalies capable of being discerned through processing of thermal images of an aircraft.

Furthermore, although illustrated as separate, it should be understood that the turn event controller 110 may include the thermal imaging processor 108 as a discrete component contained therein, or vice versa; as a dedicated circuit contained therein, or vice versa; or as another combination of processors or circuitry configured to process thermal images and/or turn events as described herein.

The turn event controller can be in operative communication with a parameter datastore 114 through network 112. The network 112 may include any suitable communications network. The parameter datastore 114 may be configured to store parameters including aircraft parameters, vehicle parameters, equipment parameters, and/or any other suitable parameters. The parameter datastore 114 can also include a variety of sources, and can include flight schedules, METAR weather data, and other descriptions. The parameter datastore 114 may be implemented as a database in some examples. According to other examples, the parameter datastore may be implemented as one or more storage devices, including distributed storage devices, arranged within or in communication with the network 112.

Generally, the system 100 is operative to obtain, process, and analyze thermal images of the aerial vehicle 102 using the thermal imaging devices 104, 106. The thermal images can be compared to expected thermal signatures or previous thermal images to detect anomalies. Furthermore, the turn event controller 110 and/or thermal imaging processor 108 can retrieve vehicle parameters from the parameter datastore 114 to determine expected thermal signature information to facilitate this processing.

Although described above as particularly being associated with an aircraft at rest, the system 100 may also function for thermal imaging of aircraft in motion. Furthermore, although being illustrated as generally being fixed in a particular location for thermal imaging of an aircraft, the same may be varied to implemented mobile thermal imaging solutions.

Figure 2:
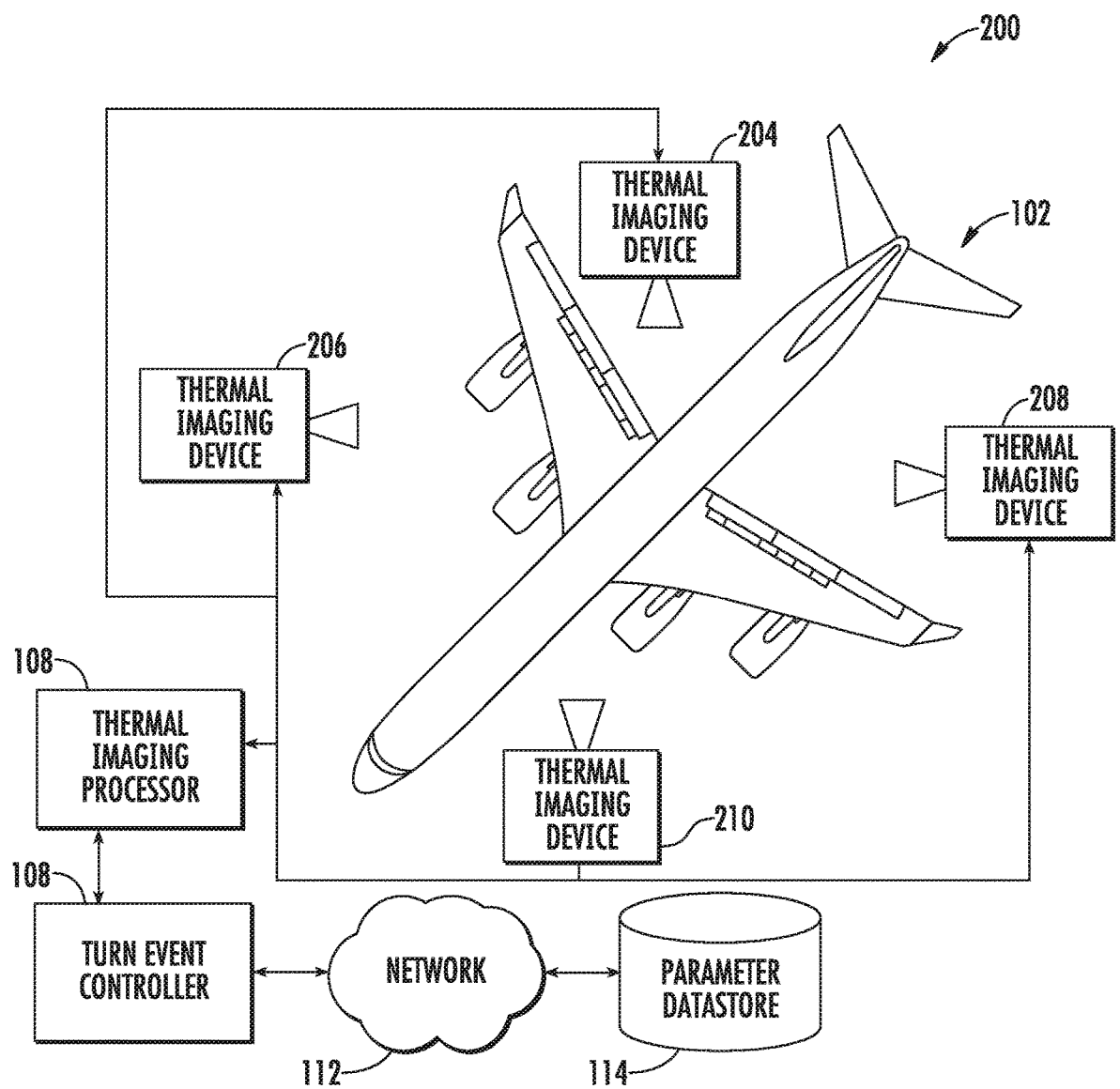
FIG. 2 is a schematic illustration of a mobile thermal imaging system to analyze aircraft, according to example embodiments of the present disclosure.

For example, FIG. 2 is a schematic illustration of a mobile thermal imaging system 200 to analyze aircraft, according to example embodiments of the present disclosure. Exhaustive description of like components is omitted herein for the sake of brevity and clarity.

The system 200 may be operative to analyze the aerial vehicle 102 at an airport or other serviceable area. The system 200 can include the thermal imaging processor 108, the turn event controller 110, and the parameter datastore 114. The thermal imaging system 200 can also include thermal imaging devices 204, 206, 208, and 210, in operative communication with the thermal imaging processor 108. Generally, the thermal imaging devices 204, 206, 208, and 210 may be similar or substantially similar to the thermal imaging devices of FIG. 1.

As illustrated, the thermal imaging devices 204, 206, 208, and 210 can be positioned about the aerial vehicle 102. Furthermore, the thermal imaging devices 204, 206, 208, and 210 can be mobile, and used to scan about the aerial vehicle 102. Mobile thermal imaging devices can include automated mobile thermal imaging devices such as thermal-image equipped drones, thermal-image equipped vehicles, easily repositioned devices, devices mounted on tripods, and other suitable mobile thermal imaging devices. For example, the thermal imaging devices 204, 206, 208, and 210 can be moved about the aerial vehicle 102 such that various views (e.g., under, over, side elevation, frontal, rearward, etc.) can be captured of the aerial vehicle 102.

Furthermore, the thermal imaging devices 204, 206, 208, and 210 and the entire system 200 may be mobile such that repositioning of one or more of the illustrated components can be facilitated with relative ease. Accordingly, the system 200 may be adaptable for virtually any size aerial vehicle.

As shown, the thermal imaging devices 204, 206, 208, and 210 can be positioned to capture thermal images of any surface or component of the aerial vehicle 102. In some examples, one or more of the thermal imaging devices 204, 206, 208, and 210 can also be positioned interior to the aerial vehicle 102, at least temporarily, for more detailed analysis of the contents of the aerial vehicle 102.

As described above, system 100 and system 200 can be used to thermal image aircraft at an airport or other suitable area. The system 100 and the system 200 can be used to thermal image aircraft for aircraft analysis, and to identify anomalies. Hereinafter, various examples of thermal images of aircraft, and various examples of areas of an aircraft that can be successfully thermal imaged, are described in detail.

Figure 3A:
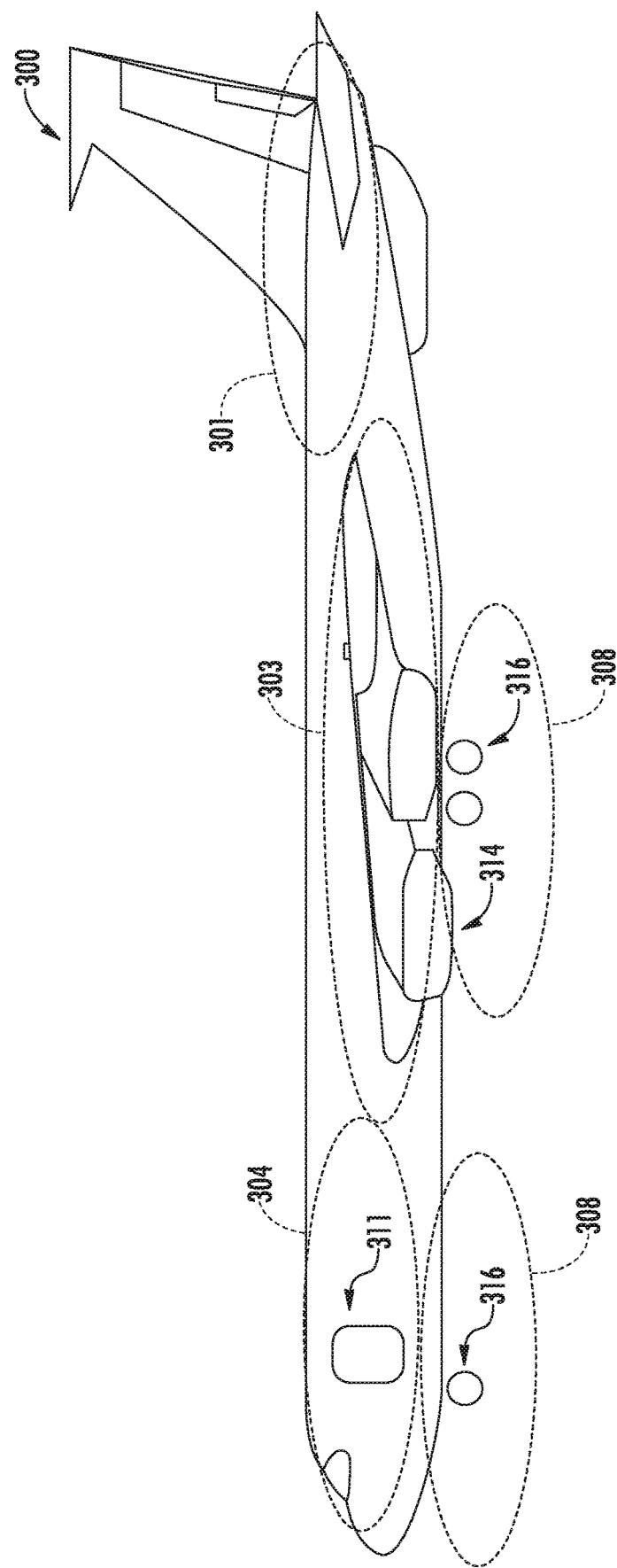
FIG. 3A is a side elevation view of an aircraft being thermally imaged.

FIG. 3A is a side elevation view of an aircraft 300 being thermally imaged. As illustrated, one or more thermal imaging devices can be used to capture thermal images of the aircraft 300. For example, control surfaces near the aft of aircraft 300 may be imaged with thermal imaging devices having view 301. For example, aircraft control surfaces, wings, engines 314, and associated components can be thermal imaged with a thermal imaging device having view 303. For example, an aircraft ingress hatch 311 may be thermal imaged with a thermal imaging device having view 304. For example, nose landing gear and tires 316 may be thermal imaged with a thermal imaging device having view 308. For example, aft landing gear 316 may be thermal imaged with a thermal imaging device having view 308. Other views and thermal images can be obtained depending upon a particular orientation of both a thermal imaging device and the aircraft being imaged.

Figure 3B:
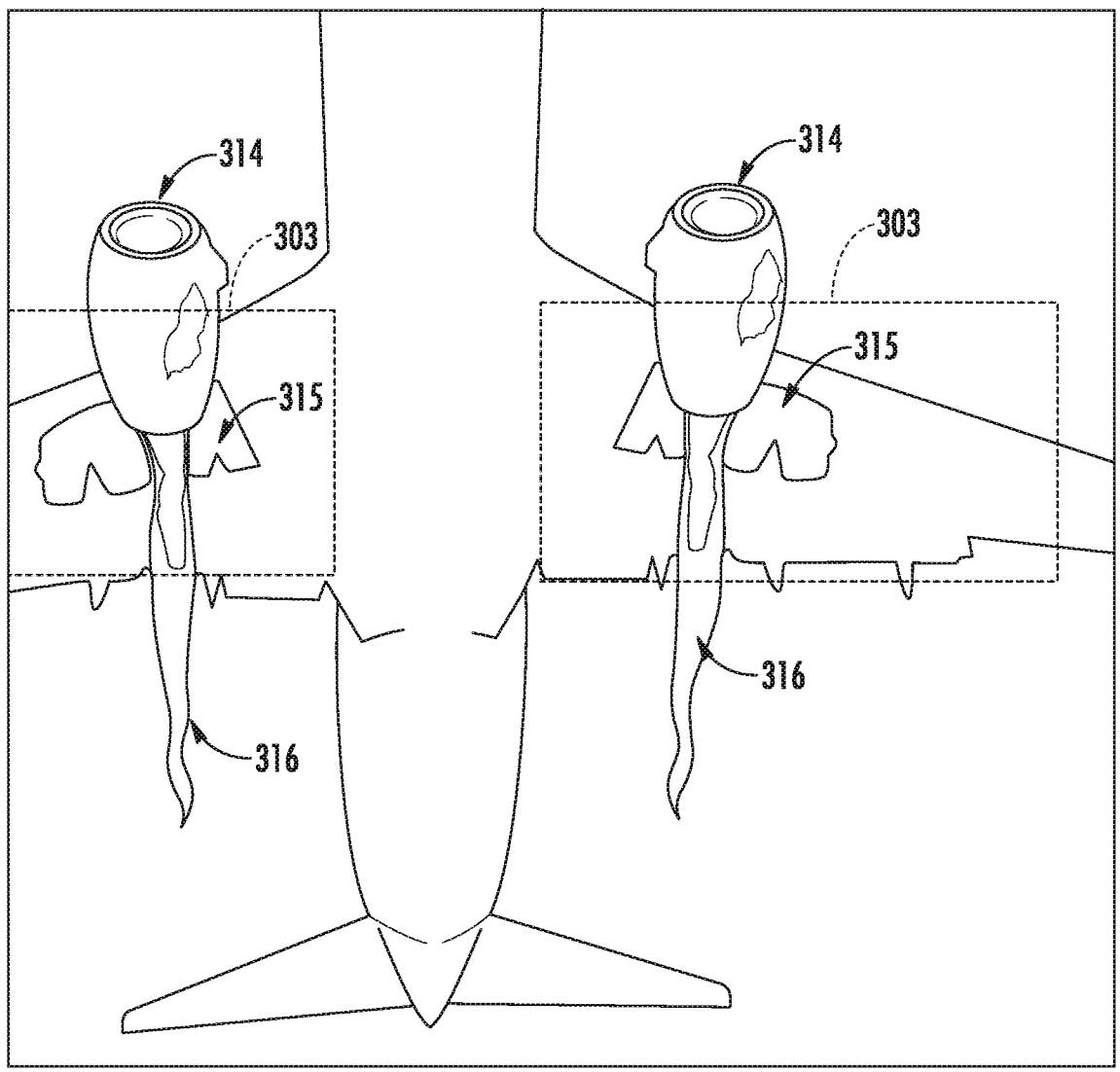
FIG. 3B is a thermal image of an undercarriage of an aircraft.

FIG. 3B is a thermal image of an undercarriage of an aircraft 300. As illustrated, a thermal imaging device having view 303 has obtained a thermal image indicating the presence of cooler areas 315 on each wing. The cooler areas 315 may be indicative of fuel being present in fuel tanks of the aircraft 300. As further shown, the thermal image can indicate that engines 314 are operational, and an exhaust plume 316 can also be examined.

Figure 3C:
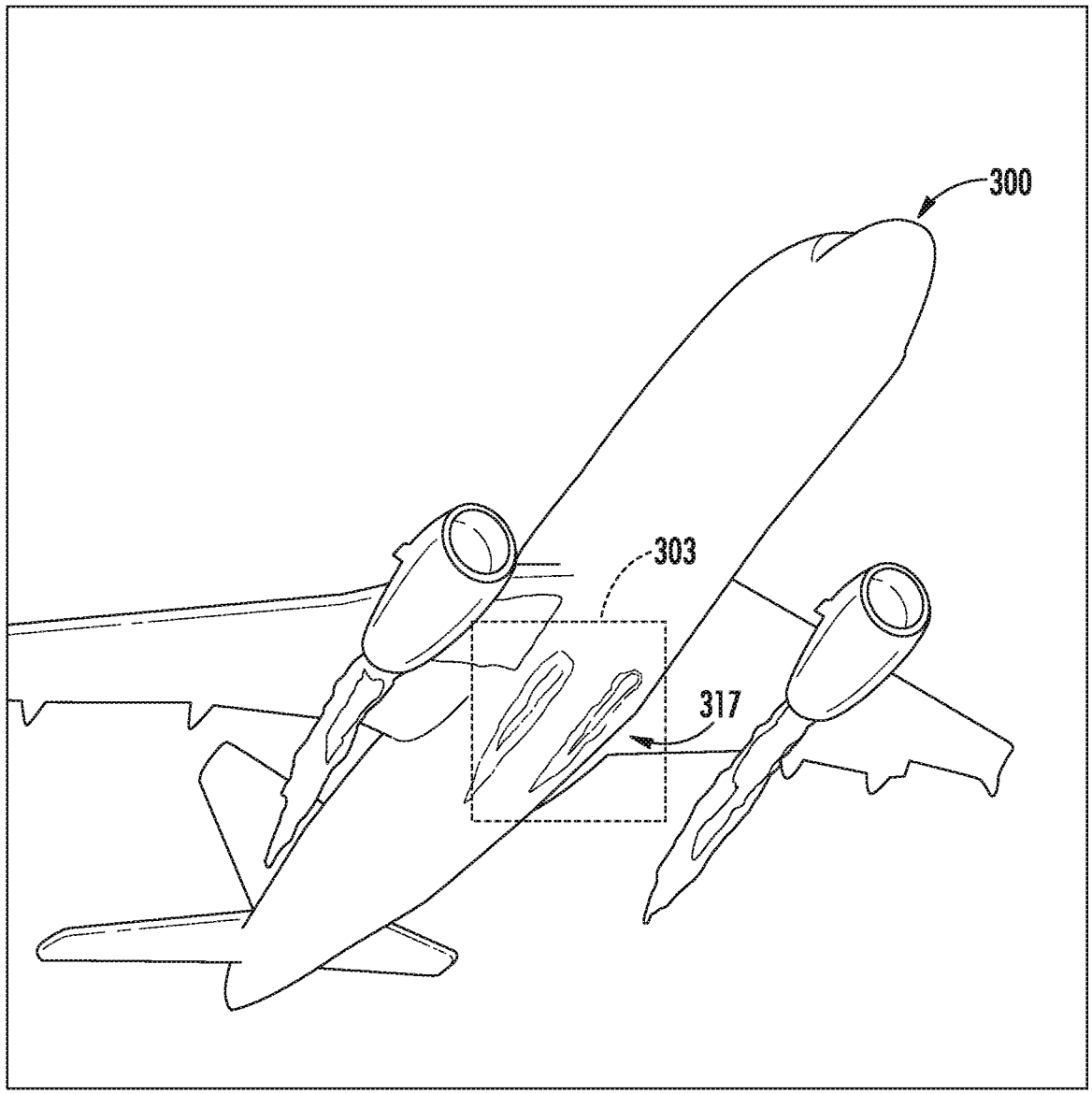
FIG. 3C is a thermal image of an undercarriage of an aircraft.

FIG. 3C is an additional thermal image of the undercarriage of the aircraft 300. As illustrated, a thermal imaging device having view 303 has obtained a thermal image indicating the presence of cooler areas 317 of the aircraft fuselage. The cooler areas 317 may be indicative of one or more "PACK" or "PAC" components associated with HVAC and cabin pressurization.

As described above, system 100 and system 200 can be used to thermal image aircraft at an airport or other suitable area. The system 100 and the system 200 can be used to thermal image aircraft for aircraft analysis, and to identify anomalies or to verify fuel levels and aircraft servicing operations.

It is noted that although described as particularly being related to aircraft turn events, thermal imaging may be used to analyze aircraft at any phase of any suitable event involving an aircraft. For example, and without limitation, other suitable aircraft events can include takeoff events, landing events, service events, testing events, data analysis events, and any other suitable event. Thermal imaging may also be used to analyze aircraft in various stages of construction to aid in ensuring proper assembly of aircraft at factories, hangars, or other facilities. Moreover, thermal imaging can also be used to analyze independent systems for use with or on an aircraft, without the aircraft necessarily being present.

Hereinafter, the operation of the system 100 and system 200 are described with reference to FIG. 4 and FIG. 5.

Figure 4:
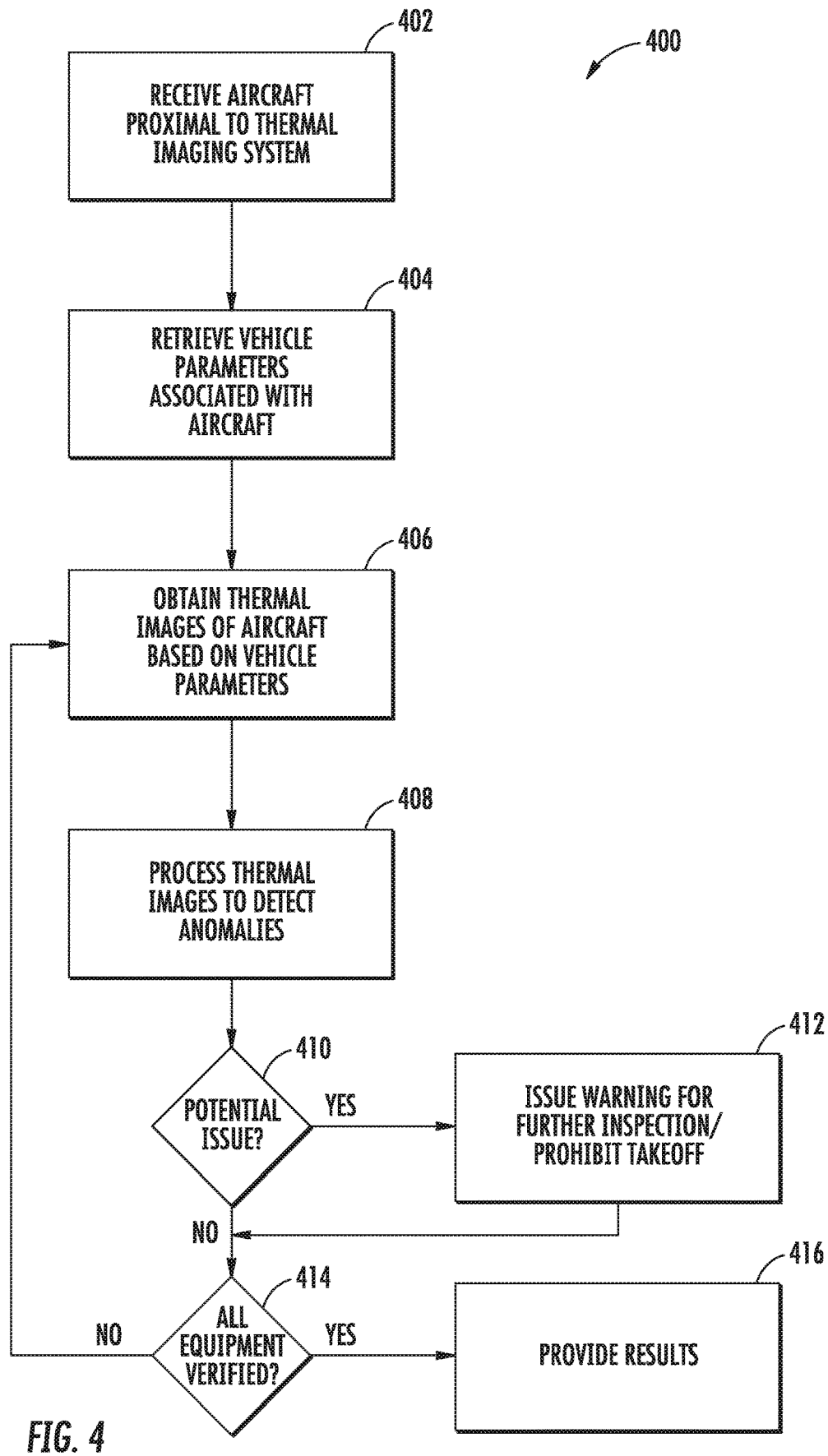
FIG. 4 is a flow diagram of a method of thermally imaging an aircraft, according to example embodiments of the present disclosure.

FIG. 4 is a flow diagram of a method 400 of thermally imaging an aircraft, according to example embodiments of the present disclosure. Generally, the method 400 can be processed by the turn event controller 110, the thermal imaging processor 108, and/or the parameter datastore 114, or any combination thereof. Furthermore, as discussed above, the thermal imaging processor 108 and turn event controller 110 may be combined as a single computer apparatus or processor, in some examples. The below description is made with reference to the thermal imaging system 100 for clarity of explanation. However, it should also be understood that the mobile thermal imaging system 200 is further capable of performing any or all of the below operations, according to any desired implementation.

As illustrated, the thermal imaging system 100 can receive an aircraft or aerial vehicle proximal to the thermal imaging system, at block 402. For example, and as illustrated in FIG. 1, the thermal imaging system 100 may receive aircraft 102 proximal to thermal imaging devices 104, 106. The received aerial vehicle 102 may therefore be within thermal imaging range of the thermal imaging devices 104, 106.

Receiving the aircraft proximal to the thermal imaging system 100 may also include receiving an aircraft identifier or other identifying data, at block 402. For example, the aircraft identifier may include a unique identifier operative to identify at least a model or configuration of the received aircraft. The aircraft identifier may also identify at least a portion of equipment associated with the received aircraft. Generally, the aircraft identifier may be received via manual input by a user at a user interface or input device. Furthermore, the aircraft identifier may be received from a database or system in a relatively automated manner, without manual input. For example, the aircraft identifier can be retrieved from flight schedules which could have been manually entered at one point, but do not require manually re-entry during an aircraft turn event or other event. Additionally, the aircraft identifier may also be determined through analysis of one or more thermal images or non-thermal images of an exterior of the received aircraft. For example, an image of a tail section of an aircraft may be processed to extrapolate a call sign, N-number, tail number, serial number, aircraft reference number, and/or name associated with the aircraft. The extrapolation may be facilitated through character analysis of indicia marked on the exterior of the aircraft.

Upon receipt of the aircraft, the turn event controller 110 may obtain one or more vehicle parameters associated with an aerial vehicle 102, at block 404. For example, the turn event controller 110 may retrieve vehicle parameters associated with the aerial vehicle 102 from the database 114.

The retrieved vehicle parameters can include, for example, descriptions of one or more equipment onboard or external to the aircraft. The equipment can include onboard equipment and external equipment. The onboard equipment can include HVAC, electrical, hydraulic, mechanical, and other onboard equipment. The external equipment can include aircraft gate equipment, gate ramps, unloading vehicles and apparatuses, HVAC servicing equipment, plumbing servicing equipment, refueling equipment, and other external equipment.

The retrieved parameters can also include descriptions of potential icing areas of the aerial vehicle 102, locations of fuel tanks, types of fuel tanks, potential tire issues, external air handler data, flight information (manifests, passenger information, personnel information, etc.), and other suitable parameters. The retrieved parameters may be received at a single operation or may be accessed or retrieved at multiple times or in multiple portions, depending upon any particular area of the aerial vehicle 102 being thermal imaged at a particular time.

The turn event controller 110 can further obtain one or more thermal images associated with the aerial vehicle 102 during at least one phase of a turn of the aerial vehicle 102 at an airport, at block 406. For example, the turn event controller 110 may request thermal imaging from one or more of the thermal imaging devices 104, 106. Optionally, or alternatively, the turn event controller 110 may request thermal imaging operations be performed by the thermal imaging processor 108. The thermal images may be received in succession, in parallel, or in any desired order. The thermal images may be still images or may be thermal image video. Furthermore, additional thermal images may be obtained in real time in some examples.

Upon receipt of the thermal images, the turn event controller 110 may process the one or more thermal images based on the one or more vehicle parameters to detect anomalies associated with the turn of the aerial vehicle 102, at block 408. For example, the turn event controller 110 may compare the thermal images to expected thermal signatures of the aerial vehicle to determine if a discrepancy exists. In another example, the turn event controller 110 may determine if there is an uneven heat distribution in the thermal images. In yet another example, the turn event controller 110 may determine if a maximum safe temperature has been exceeded in any area of the thermal images. In yet another example, the turn event controller 110 may determine if a heat distribution in the thermal images does not match a desired or safe thermal profile. Other forms of determining anomalies are also anticipated, and are considered to be within the scope of this disclosure.

As another example of processing, the turn event controller 110 can process the one or more thermal images using one or more feature detection techniques to identify one or more objects from the one or more thermal images or thermal image video. As another example, the turn event controller 110 can process the one or more thermal images using one or more feature detection techniques to identify one or more objects from the one or more thermal images. Processing the one or more thermal images can include extracting data associated with the one or more objects. The one or more feature detection techniques can include a histogram of oriented gradients (HOG) classifier, a Haar classifier, a deep learning algorithm, the like, and/or any combination of the foregoing. The one or more identified objects can include personnel, passengers, cargo, equipment components, other vehicles, other aircraft, additional flight turn support objects, the like, and/or any combination of the foregoing. In one example, processing the one or more thermal images can include detecting one or more shapes (e.g., circles) within the one or more thermal images. In a further example, processing the one or more thermal images can include detecting one or more equipment components based on the one or more shapes. Extracting the data associated with the one or more objects can include extracting size and/or position information associated with the one or more objects, such as one or more of the one or more shapes.

According to at least one example, the turn event controller 110 can transfer raw thermal image data or processed thermal image data to a remote location for processing and aggregation with other sources. For example, the turn event controller 110 can transmit the raw thermal image data or processed thermal image data to the datastore 114 over network 112, or to another storage or remote computer apparatus. Additionally, thermal image processing can be combined with computer vision processing of other information and data. For example, visual data, flight schedules, aircraft communications addressing and reporting system, and other data can be compared to or correlated with thermal image processing data to further enhance aircraft analysis. Accordingly, the transferred raw thermal image data or processed thermal image data can be used to avoid or reduce false-positives based on an outcome of prior analyses, on correlated data, or based on other data.

Turning back to FIG. 4, the turn event controller 110 can further determine, based on the processing of the thermal images, if a potential issue or a potential anomaly exists, at block 410. Thereafter, the turn event controller can generate, in response to detecting one or more anomalies, one or more signals indicative of the one or more anomalies, at block 412.

The one or more signals can directly or indirectly cause the system 100 to issue warnings, issue requests for further inspection of the aerial vehicle, and/or prohibit the aerial vehicle 102 from subsequent takeoff until some or all anomalies are vetted. The one or more signals can also directly or indirectly cause the turn event controller 110 to provide a set of detailed analysis results at block 416 after, or at substantially the same time, as determining that all aircraft equipment has been verified or analyzed via thermal imaging at block 414.

It is noted that the method 400 may iterate until all aircraft equipment has been verified, or until a turn event or phase of a turn event has been successfully completed. It is also noted that the method 400 may cease at any time, including with immediate issuing of warnings associated with potential explosion or fire risks identified in the thermal images. The method 400 may also cease due to personnel intervention, human override of a turn event process, or based on other signals.

Figure 5:
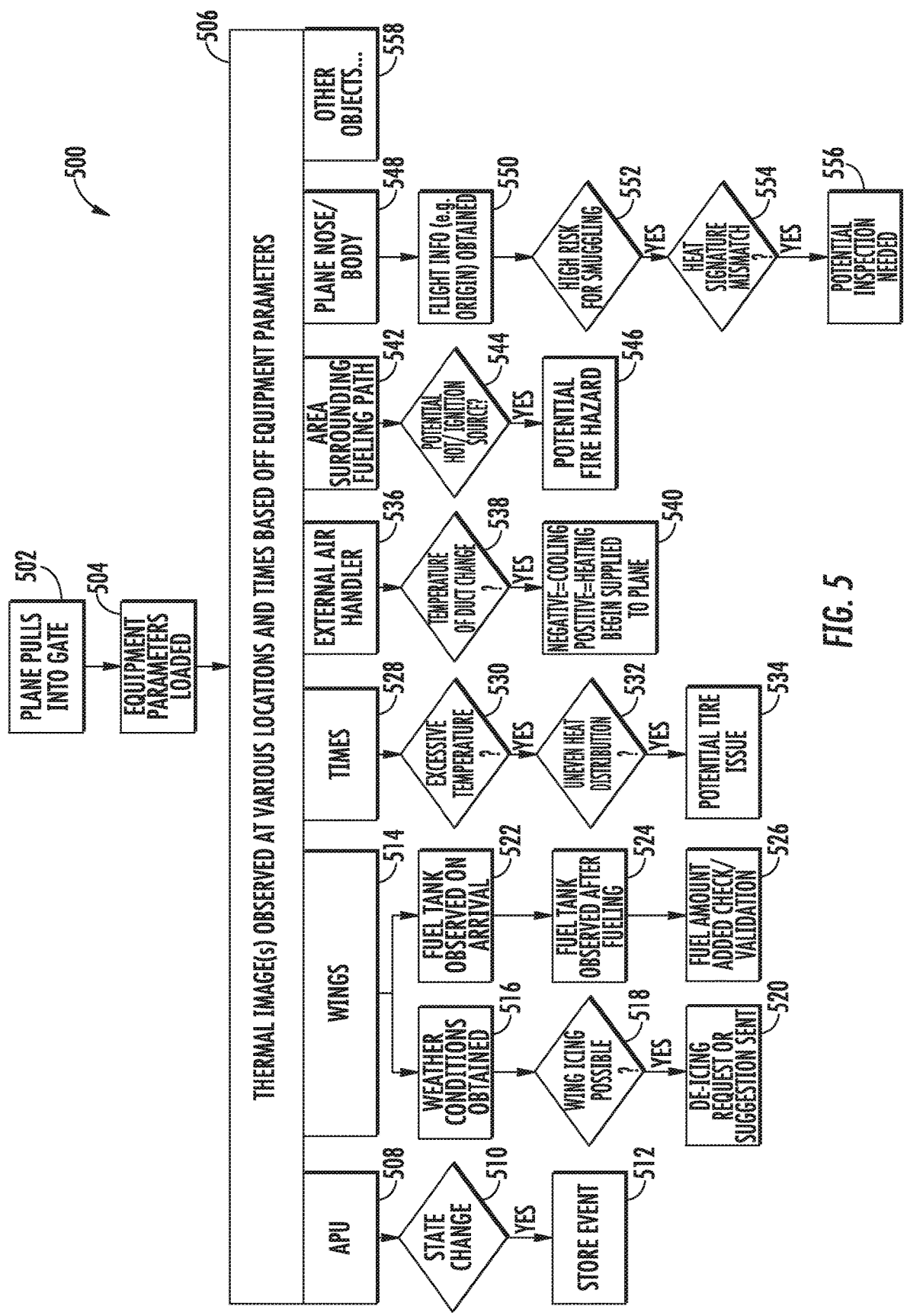
FIG. 5 is a flow diagram of an additional method of thermally imaging an aircraft, according to example embodiments of the present disclosure.

Turning now to FIG. 5, a more detailed discussion of aircraft analysis options using the systems 100 and 200 is provided. FIG. 5 is a flow diagram of an additional method 500 of thermally imaging an aircraft, according to example embodiments of the present disclosure.

As illustrated, the method 500 can include receiving an aircraft at a gate or designated area, at block 502. The method 500 further includes retrieving or obtaining vehicle parameters, at block 504. Generally, the aircraft may be received similarly as described above, and the vehicle parameters may also be received similar as described above. The method 500 also includes thermal imaging the aircraft at various positions and times, based on the retrieved vehicle parameters, at block 506. The thermal imaging of block 506 may be facilitated through intelligently imaging portions of the received aircraft based on equipment information associated with the vehicle parameters.

For example, a received aircraft may be identified uniquely, and thereafter, a list of vehicle parameters may be retrieved. The vehicle parameters can include descriptions of one or more equipment onboard or external to the aircraft. The equipment can include onboard equipment and external equipment. The onboard equipment can include HVAC, electrical, hydraulic, mechanical, and other onboard equipment. The external equipment can include aircraft gate equipment, gate ramps, unloading vehicles and apparatuses, HVAC servicing equipment, plumbing servicing equipment, refueling equipment, and other external equipment.

Upon thermal imaging of the aircraft or portions thereof, the method 500 may conclude by determining if any anomalies exist, and providing one or more signals based on the determining, as described based on thermal imaging options, below.

Optionally, the method 500 can include thermal inspection of an auxiliary power unit at block 508. The method 500 can include determining if a state of the APS has changed at block 510, and storing a state change event at a datastore, at block 512.

Optionally, the method 500 can include thermal inspection of a portion or entirety of wings of the aircraft, at block 514. For example, the method 500 can obtain weather conditions at block 516. In this example, the vehicle parameters can also include an identifier or determination of a potential icing location on the aerial vehicle, at block 518. Thereafter, the method 500 can include determining a temperature based on correlating the potential icing location with a particular portion of each of the one or more thermal images, at block 520, to generate a signal indicative of a potential icing event.

Similarly, the vehicle parameters can also include an identifier of a fuel tank location or a fuel tank type, or an observation of fuel tank upon landing of the aerial vehicle, at block 522. Thereafter, the method 500 can further include thermal imaging of the aircraft to inspect the fuel tanks after fueling operations are complete, at block 524. In this example, the method 500 can include determining fuel level based on correlating the fuel tank location or fuel tank type with a particular portion of each of the one or more thermal images, at block 526. It is noted that thermal imaging can also be performed during fueling operations to determine if a fuel leak or other fuel anomaly exists.

Optionally, the method 500 can include thermal inspection of tires and/or landing gear, at block 528. In this example, the method 500 can include determining if a target or safe temperature has been exceeded, at block 530. Furthermore, in this example, the method can include determining if there is an uneven or unsafe heat distribution associated with the tires or landing gear, at block 532. Thereafter, the method 500 can include generating a signal indicative of a potential tire issue, at block 534, based on the determining.

Optionally, the method 500 can include thermal inspection of external air handling/servicing equipment, at block 536. In this example, the method 500 can include determining if a temperature change is detected in ducts attached to the aircraft, at block 538. Accordingly, the method 500 can include generating signals indicative of externally supplied cool or hot air to the aircraft, at block 540.

Optionally, the method 500 includes thermal inspection of areas exterior to, adjacent to, proximal to, and/or surrounding the aircraft, at block 542. In this example, the method 500 includes determining if there is a potential ignition source near or proximal the aircraft, at block 544. For example, the method 500 can include identifying areas within the thermal images that are above a particular temperature threshold. Furthermore, the method 500 can include identifying objects within the thermal images that are above a particular temperature threshold. Thereafter, the method 500 includes generating a signal indicative of the potential fire hazard, at block 546.

Optionally, the method 500 includes thermal inspection of an aircraft interior, including an interior of the fuselage, cargo area, and/or nose cone, at block 548. In this example, the method 500 can include obtaining flight information including associated passenger, flight crew, and/or cargo manifests, at block 550. Thereafter, the method 500 can determine if there is a relatively high risk for cargo or human smuggling for the aircraft, at block 552. The method 500 can also include determining if there is a heat signature mismatch between an actual heat signature of the interior of the aircraft and an expected heat signature of the interior of the aircraft, at block 554. Thereafter, the method 500 includes generating a signal indicative of further inspection necessary for the aircraft interior spaces, at block 556.

Optionally, the method 500 can also include thermal inspection of other objects associated with the received aircraft, at block 558. The other objects can be identified through intelligent image processing as described above, shape identification, heat signature anomalies, and/or other methodologies.

As described above, methods of thermal inspection of aircraft can include obtaining one or more vehicle parameters associated with an aerial vehicle and obtaining one or more thermal images associated with the aerial vehicle during at least one phase of a turn of the aerial vehicle at an airport. Methods can also include processing the one or more thermal images based on the one or more vehicle parameters to detect anomalies associated with the turn of the aerial vehicle, and generating, in response to detecting one or more anomalies, one or more signals indicative of the one or more anomalies. The one or more signals can directly or indirectly cause the thermal inspection systems 100, 200, or components thereof, to issue warnings, request further inspection, prevent or prohibit future takeoff operations, and/or other suitable actions.

Figure 6:
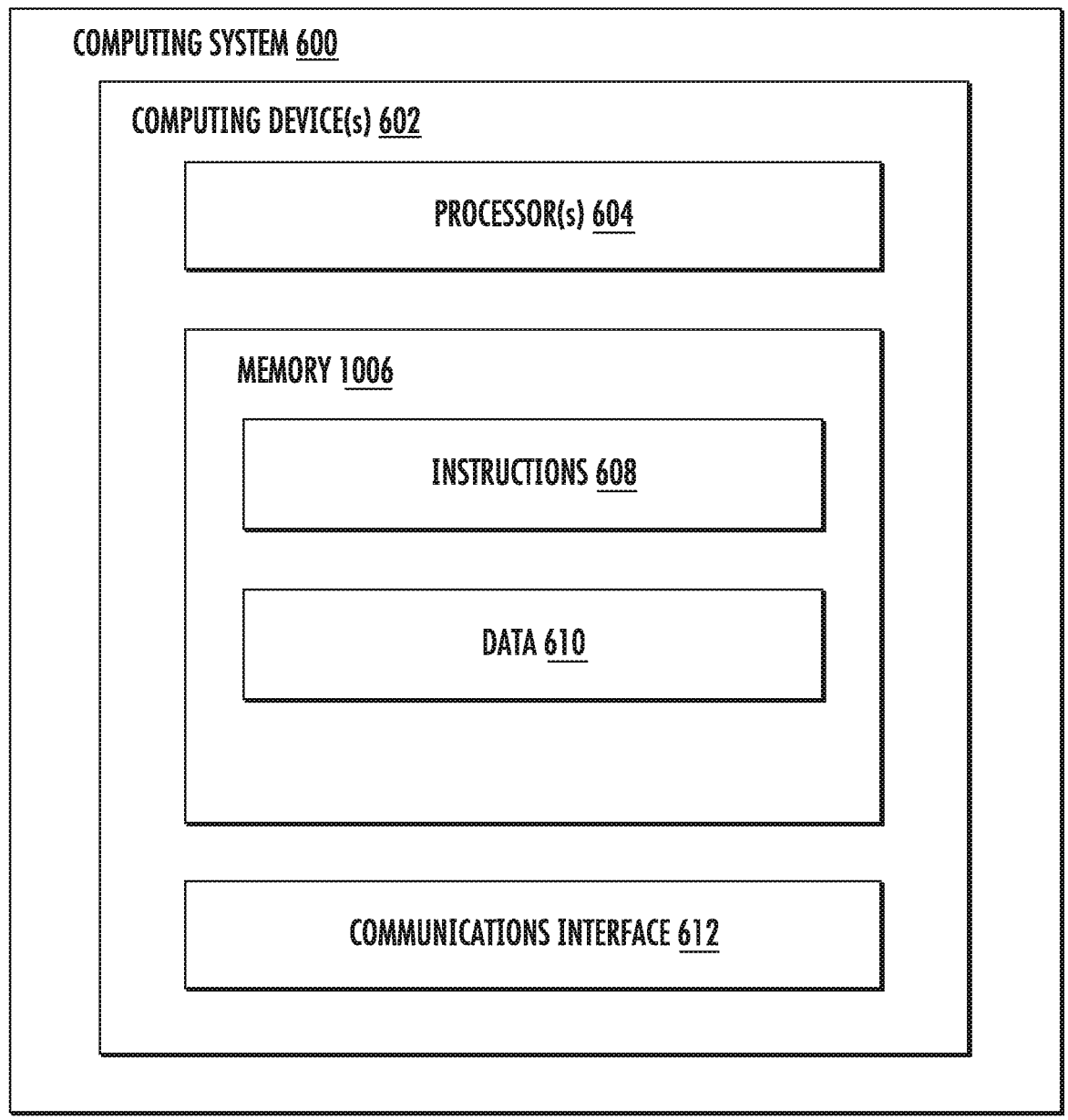
FIG. 6 is a block diagram of an example computing system that can be used to implement methods and systems according to example embodiments of the present disclosure.

FIG. 6 depicts a block diagram of an example computing system 600 that can be used to implement one or more components of the thermal inspection systems 100, 200 or other systems according to example embodiments of the present disclosure. As shown, the computing system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for observing and/or analyzing aircraft turns and thermal images, as described with reference to FIG. 4 and/or with reference to FIG. 5.

The memory device(s) 606 can further store data 610 that can be accessed by the processors 604. For example, the data 610 can include thermal images, thermal image video, vehicle parameters, prior thermal inspection data, as described herein. The data 610 can include one or more table(s), function(s), algorithm(s), model(s), equation(s), etc. for observing and/or analyzing aircraft turns according to example embodiments of the present disclosure.

The one or more computing device(s) 602 can also include a communication interface 612 used to communicate, for example, with the other components of the system and/or other computing devices. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A thermal imaging system to analyze aircraft, comprising:
one or more thermal imaging devices; and
a turn event controller in operative communication with the one or more thermal imaging devices, the turn event controller configured to:
receive an aircraft identifier associated with an aerial vehicle received proximate to the thermal imaging system, the aircraft identifier indicating equipment onboard the aerial vehicle and a model or configuration of the aerial vehicle;
obtain one or more vehicle parameters associated with the received aircraft, the one or more vehicle parameters including equipment information associated with the equipment onboard the aerial vehicle;
obtain, from the one or more thermal imaging devices positioned offboard of the received aerial vehicle, one or more thermal images that capture at least a portion of the aerial vehicle associated with the equipment onboard the aerial vehicle during at least one phase of a turn of the aerial vehicle at an airport;
receive, from a data store communicatively coupled with the turn event controller, expected thermal signature information associated with the equipment onboard the aerial vehicle;

detect one or more anomalies associated with the turn of the aerial vehicle based on the one or more thermal images and the expected thermal signature information; and generate, in response to detecting the one or more anomalies, one or more signals indicative of the one or more anomalies.

2. The system of claim 1, wherein the one or more thermal imaging devices comprise thermal imaging cameras.

3. The system of claim 1, further comprising a thermal imaging processor in operative communication with the turn event controller and the one or more thermal imaging devices, wherein the thermal imaging processor is configured to analyze thermal images to determine whether a first thermal image depicts a thermal anomaly.

4. The system of claim 1, wherein:
the one or more vehicle parameters include an identifier of a potential icing location on the aerial vehicle; and
detecting the one or more anomalies associated with the turn of the aerial vehicle based on the one or more thermal images and the expected thermal signature information comprises determining a temperature based on correlating the potential icing location with a particular portion of each of the one or more thermal images.

5. The system of claim 1, wherein:
the one or more vehicle parameters include an identifier of a fuel tank location of a fuel tank of the aerial vehicle,
wherein the obtained one or more thermal images comprise one or more thermal images of the fuel tank captured by the one or more thermal imaging devices based on the fuel tank location, and
detecting the one or more anomalies associated with the turn of the aerial vehicle based on the one or more thermal images and the expected thermal signature information comprises determining a fuel level of fuel within the fuel tank based on the one or more thermal images of the fuel tank.

6. The system of claim 1, wherein:
the one or more vehicle parameters include an identifier of a tire location of a tire of the aerial vehicle;
wherein the obtained one or more thermal images comprise one or more thermal images of the tire of the aerial vehicle captured by the one or more thermal imaging devices, and
detecting the one or more anomalies associated with the turn of the aerial vehicle based on the one or more thermal images and the expected thermal signature information comprises determining whether a temperature of the tire exceeds a target temperature.

7. The system of claim 1, wherein the one or more thermal imaging devices are mobile thermal imaging devices that are movable relative to the aerial vehicle.

8. The system of claim 1, wherein the turn event controller is further configured to verify that a heating-ventilation-and-air-conditioning (HVAC) system of the aircraft has been serviced by comparing the one or more thermal images and the expected thermal signature information.

9. The system of claim 1, wherein the turn event controller is further configured to determine whether there is any external danger from fire or potential ignition sources proximate the aircraft by comparing the one or more thermal images and the expected thermal signature information.

10. The system of claim 1, wherein the turn event controller is further configured to determine an approximate number and location of people on board the aircraft.

11. The system of claim 10, wherein the turn event controller is further configured to determine if the approximate number of people on board the aircraft indicates illegal activity.

12. The system of claim 1, wherein the turn event controller is further configured to issue a warning or alarm based on the one or more signals.

13. The system of claim 1, wherein the turn event controller is further configured to prohibit the aerial vehicle from becoming airborne based on the one or more signals.

14. The system of claim 1, wherein detecting the one or more anomalies associated with the turn of the aerial vehicle based on the one or more thermal images and the expected thermal signature information comprises comparing the one or more thermal images against the expected thermal signatures to identify the anomalies.

15. A computer-implemented method to analyze aircraft, comprising:
receiving an aircraft identifier associated with an aerial vehicle received proximate to one or more thermal imaging devices of a thermal imaging system, the aircraft identifier indicating equipment onboard the aerial vehicle and a model or configuration of the aerial vehicle;
obtaining one or more vehicle parameters associated with the aerial vehicle;
obtaining, from the one or more thermal imaging devices mounted offboard to the aerial vehicle, one or more thermal images associated with the aerial vehicle;
processing the one or more thermal images based on the one or more vehicle parameters to detect anomalies associated with an event associated with the aerial vehicle;
generating, in response to detecting one or more anomalies, one or more signals indicative of the one or more anomalies; and
issuing, based on the one or more signals, one or more warning messages based on the one or more signals.

16. The method of claim 15, the one or more thermal imaging devices are mobile thermal imaging devices that are movable relative to the aerial vehicle.

17. The method of claim 15, further comprising:
prohibiting the aerial vehicle from becoming airborne based on the one or more signals.

18. A thermal imaging system to analyze aircraft, comprising:
one or more thermal imaging devices; and
a turn event controller in operative communication with the one or more thermal imaging devices, the turn event controller configured to:
receive identifying information associated with an aerial vehicle to be analyzed by the thermal imaging system, the identifying information indicating equipment onboard the aerial vehicle;
obtain one or more thermal images that capture portions of the aerial vehicle associated with the equipment onboard the aerial vehicle during at least one phase of a turn of the aerial vehicle at an airport;
receive, from a data store communicatively coupled with the turn event controller, expected thermal signature information associated with the equipment identified onboard the aerial vehicle;
detect one or more anomalies associated with the turn of the aerial vehicle based on the obtained one or more thermal images and the expected thermal signature information; and generate, in response to detecting the one or more anomalies, one or more signals indicative of the one or more anomalies.

19. The system of claim 18, the one or more thermal imaging devices are mobile thermal imaging devices that are movable relative to the aerial vehicle.

20. The system of claim 18, wherein the turn event controller is configured to:
obtain at least one of a passenger manifest, a flight crew manifest, and a cargo manifest associated with the aerial vehicle, and
obtain one or more interior thermal images associated with an interior of the aerial vehicle, and
wherein in detecting the one or more anomalies associated with the turn of the aerial vehicle, the turn event controller is configured to determine whether a mismatch between an actual heat signature of the interior of the aerial vehicle and an expected heat signature of the interior of the aerial vehicle is present based on the obtained one or more interior thermal images and the expected thermal signature information.

* * * * *